US008826366B2

(12) United States Patent
Narain et al.

(10) Patent No.: US 8,826,366 B2
(45) Date of Patent: Sep. 2, 2014

(54) VERIFYING ACCESS-CONTROL POLICIES WITH ARITHMETIC QUANTIFIER-FREE FORM CONSTRAINTS

(75) Inventors: Sanjai Narain, Madison, NJ (US); Gary Levin, Bedminster, NJ (US)

(73) Assignee: TT Government Solutions, Inc., Piscataway, NJ (US)

( * ) Notice: Subject to any disclaimer, the term of this patent is extended or adjusted under 35 U.S.C. 154(b) by 628 days.

(21) Appl. No.: 12/837,068

(22) Filed: Jul. 15, 2010

(65) Prior Publication Data

US 2012/0017260 A1 Jan. 19, 2012

(51) Int. Cl.
| | |
|---|---|
| G06F 17/00 | (2006.01) |
| G06F 11/00 | (2006.01) |
| G06F 21/62 | (2013.01) |
| G06F 13/362 | (2006.01) |
| G06F 21/60 | (2013.01) |
| G06F 13/00 | (2006.01) |
| G06F 7/60 | (2006.01) |
| H04L 29/06 | (2006.01) |

(52) U.S. Cl.
CPC ............... *G06F 17/00* (2013.01); *G06F 11/00* (2013.01); *G06F 21/62* (2013.01); *G06F 13/362* (2013.01); *G06F 21/604* (2013.01); *G06F 21/6209* (2013.01); *G06F 13/00* (2013.01); *G06F 7/60* (2013.01); *H04L 29/06823* (2013.01)
USPC .................................................. 726/1; 703/22

(58) Field of Classification Search
CPC ...... G06F 9/45; G06F 17/00; H04L 29/06823
USPC .................... 726/1; 714/38; 703/22
See application file for complete search history.

(56) References Cited

U.S. PATENT DOCUMENTS

| | | | |
|---|---|---|---|
| 6,993,026 B1 * | 1/2006 | Baum et al. .................... | 370/392 |
| 7,606,774 B2 * | 10/2009 | Musuvathi et al. ............. | 706/14 |
| 7,853,906 B2 * | 12/2010 | Ganai et al. .................... | 717/104 |
| 8,402,439 B2 * | 3/2013 | Gulwani et al. ............... | 717/126 |
| 2004/0019468 A1 * | 1/2004 | De Moura et al. ................ | 703/2 |
| 2004/0049474 A1 * | 3/2004 | Shankar et al. .................. | 706/46 |
| 2004/0123150 A1 * | 6/2004 | Wright et al. ................. | 713/201 |
| 2004/0148382 A1 * | 7/2004 | Narad et al. .................. | 709/223 |
| 2005/0229044 A1 * | 10/2005 | Ball ............................... | 714/38 |
| 2006/0184342 A1 | 8/2006 | Narain | |
| 2007/0016947 A1 * | 1/2007 | Balissat et al. ................. | 726/15 |
| 2008/0172716 A1 | 7/2008 | Talpade et al. | |

(Continued)

OTHER PUBLICATIONS

Fielding et al., "Hypertext Transfer Protocol—HTTP/1.1", 1999.*

(Continued)

*Primary Examiner* — Ondrej Vostal
(74) *Attorney, Agent, or Firm* — Heslin Rothenberg Farley & Mesiti P.C.

(57) ABSTRACT

A system and method is provided for verifying an access-control policy against a particular constraint for a multi-step operation. In disclosed embodiments, the method includes expressing the access-control policy as a first quantifier-free form (QFF) constraint and identifying the particular constraint as a second QFF constraint. The method also includes identifying an operation vector and providing copies of the operation vector associated with steps in the multi-step operation. The method also includes determining a third QFF constraint using the first QFF constraint, the second QFF constraint, and the copies of the operation vector. The method also includes solving the third QFF constraint to determine a solution and outputting a result of the solving.

17 Claims, 8 Drawing Sheets

(56) References Cited

U.S. PATENT DOCUMENTS

| | | | |
|---|---|---|---|
| 2009/0150972 A1* | 6/2009 | Moon et al. | 726/1 |
| 2009/0222393 A1* | 9/2009 | Ganai | 706/46 |
| 2009/0265296 A1 | 10/2009 | Narain et al. | |
| 2009/0300350 A1* | 12/2009 | Gai et al. | 713/160 |
| 2009/0326907 A1* | 12/2009 | Gulwani et al. | 703/22 |
| 2010/0088680 A1* | 4/2010 | Ganai et al. | 717/126 |
| 2010/0165991 A1* | 7/2010 | Veal et al. | 370/392 |
| 2010/0281086 A1* | 11/2010 | Ganai et al. | 708/207 |
| 2010/0287598 A1* | 11/2010 | Korkishko et al. | 726/1 |
| 2010/0299654 A1* | 11/2010 | Vaswani et al. | 717/128 |
| 2011/0035469 A1* | 2/2011 | Smith et al. | 709/220 |
| 2011/0055237 A1* | 3/2011 | Veanes et al. | 707/759 |

OTHER PUBLICATIONS

Ioakimidis, "Inequality constraints in one-dimensional finite elements for an elastic beam on a tensionless Winkler foundation", 1996.*
Wies et al., "Field Constraint Analysis", 2006.*
Naranin et al., "Declarative Infrastructure Configuration Synthesis and Debugging", 2008.*
Ioakimidis, "Quantifier-Free Formulae for Inequality Contraints Inside Boundary Elements", 2009.*
Siahaan, "Security-by-Contract Using Automata Modulo Theory", Feb 2010.*
Benzaken et al., "Themis: A Database Programming Language Handling Integrity Constraints", 1995.*
Wolper et al., "On the Construction of Automata from Linear Arithmetic Constraints", 2000.*
Henzinger et al., "Symbolic Model Checking for Rectangular Hybrid Systems", 2000.*
Baukus et al., "Abstracting WS1S Systems to Verify Parameterized Networks", 2000.*
Henzinger et al., "Fair Bisimulation", 2000.*
Abdulla et al., "Symbolic Reachability Analysis Based on SAT-Solvers", 2000.*
Rusu et al., "An Approach to Symbolic Test Generation", 2000.*
Das et al., "Counter-Example Based Predicate Discovery in Predicate Abstraction", 2002.*
Lahiri et al., "Modeling and Verification of Out-of-Order Microprocessor in UCLID", 2002.*
Strichman, "On Solving Presburger and Linear Arithmetic with SAT", 2002.*
Ganesh et al., "Deciding Presberger Arithmetic by Modeling Checking and Comparisons with Other Methods", 2002.*
Matousek et al., "A Formal Model for Network-wide Security Analysis", 2008.*
Ganapathy et al., "Automatic Discovery of API-Level Vulnerabilities", 2004.*
Jarke et al., "Query Optimization in Database Systems", 1984.*
Chatterjee et el., "A Reachability Predicate for Analyzing Low-Level Software", 2007.*
Garg et al., "A Model Deconstruction of Access Control Logics", 2008.*
Li et al., "Datalog with Constraints: A Foundation for Trust Management Languages", 2003.*
Bevier et al., "An Approach to Systems Verification", 1989.*
Narain, S., et al., "Declarative Infrastructure Configuration Synthesis and Debugging", Journal of Network Systems Management, vol. 16, Issue 3, 2008, pp. 235-258.
Named, H., et al., "Modeling and Verification of IPSec and VPN Security Policies", Proceedings of IEEE International Conference on Network Protocols, Nov. 2005.
Hughes, G., et al., "Automated Verification of XACML Policies Using a SAT Solver", Workshop Proceedings of the 7th International Conference on Web Engineering, Workshop on Web Quality, Verification and Validation (WQVV 2007), Como, Italy, Jul. 16-20, 2007, pp. 378-392.

* cited by examiner

VERIFYING ACCESS-CONTROL POLICIES WITH ARITHMETIC QUANTIFIER-FREE FORM CONSTRAINTS

STATEMENT REGARDING FEDERALLY SPONSORED RESEARCH

Funding for research was partially provided by Air Force Rome Laboratories (AFRL) under federal contract FA8750-07-C-0030. The federal government has certain rights in this invention.

RELATED APPLICATION

This application claims priority from Provisional Application No. 61/287,307, filed Dec. 17, 2009 the contents of which are hereby incorporated by reference.

BACKGROUND

1. Technical Field

Disclosed embodiments related to computerized systems, computer-implemented methods, and computer-readable media. In particular, disclosed embodiments relate to verifying an access-control policy with arithmetic quantifier-free form constraints.

2. Description of the Related Art

Computer systems often implement access-control policies to prevent certain operations from taking place or to allow other operations to take place. For example, as is known in the art, a network firewall may filter incoming and/or outgoing network packets, such as IP packets for example. The firewall may allow some incoming packets to pass through the firewall and may block other packets from passing through. The firewall may rely on an access-control policy, which includes rules, to determine which packets to allow and which packets to block.

The firewall may use the rules to evaluate an operation vector, which may be a series of values defining an operation. For example, an operation vector may define each incoming packet. In a firewall, the operation vector may be values in a header of an incoming IP packet, such as source address and destination address. A rule from the access-control policy may be applied to the operation vector of the IP packet. If the values of the operation vector satisfy the rules, then the firewall may allow the operation by permitting the IP packet to pass.

The rules may be expressed in a language or in some format, and may express constraints on one or more fields of an operation vector. For example, an access-control policy rule in a firewall may be:

$$[1,3,4,6,\text{deny}] \qquad \text{Equation 1}$$

Each of 1, 3, 4, and 6 in Equation 1 may represent a different IP address, and "deny" may represent the operation of denying or blocking a packet through the firewall. The rule in Equation 1 indicates that if the source address of the operation vector is in the range between 1 and 3, and the destination address of the operation vector is in the range between 4 and 6, then the firewall should "deny" the IP packet and block it from passing through the firewall. This rule may be applied to an operation vector, which includes both the source address and the destination address of an IP packet header of the incoming IP packet. For example, the operation vector may be:

$$[2,5] \qquad \text{Equation 2}$$

The value of 2 may be the source address of the IP packet, and the value of 5 may be the destination address of the IP packet. The firewall may apply the constraint in the rule of Equation 1 to the operation vector of Equation 2. Specifically, the firewall may determine that the source address of the IP packet 2 is within the range 1-3, and may determine that the destination address of the IP packet 5 is in the range of 4-6. Accordingly, in this example, the values in the operation vector of Equation 2 meet the constraints in the rule of Equation 1, and therefore, the firewall denies the IP packet in accordance with the "deny" value in the fifth field of Equation 1, by blocking the IP packet from passing through the firewall.

Access-control policies may be used in other contexts, in addition to firewalls. For example, in operating systems, access-control policies may allow or prevent an object from writing to or reading from another object. Specifically, the operating system may implement a multi-level security (MLS) scheme to assign different security levels to different objects. This access-control policy may prevent specific interactions between certain objects, based on the security levels associated with the objects. One of ordinary skill will recognize that the use of "objects" herein is not restrictive, one or more other computing constructs may be used, such as processes, threads, files, instantiated classes, etc.

Accordingly, this access-control policy may include rules governing writing and reading among objects of different security levels. For example, an access-control policy rule in an MLS operating system may be:

$$[\text{read write},\text{target security}-\text{subject security}<2] \qquad \text{Equation 3}$$

The first field in Equation 3 ("read write") may represent operations associated with the access-control policy rule. And the second field in Equation 3 may represent a constraint on an operation vector that must be true for the operations in the first field to be executable. In this example, Equation 3 states that in order for a subject object to write to or read from a target object, the target object must be less than two security levels greater than the subject object's security level (i.e., target security−subject security<2). Such a rule may be useful in MLS operating systems to prevent a relatively unsecured object from accessing protected data associated with an object two or more security levels higher.

Similar to firewalls, operations between objects in an MLS operating system environment may also be defined by operation vectors. As discussed, an operation vector may be a series of values defining an operation. In the firewall example, the operation vector comprised the source and destination values in the incoming IP packet header. In the exemplary MLS operation system environment, however, the operation vector may be a series of values describing a write or read between two objects, such as $$[\text{Object0},0,\text{Object2},2,\text{read}] \qquad \text{Equation 4}$$

The operation vector in Equation 4 describes an operation in which a subject Object0 with a security level 0 seeks to read from a target Object2 with a security level of 2. An operating system may apply the access-control policy rule of Equation 3 to the operation vector of Equation 4. By doing so, the operating system would determine that, counter to the requirement in Equation 3, the security level (2) of the target object (Object2), is not less than two security levels greater than the security level (0) of the subject object (Object0). In fact, Object2 is exactly two security levels higher than Object0. Accordingly, the access-control policy rule in Equation 3 would not be satisfied when applied to operation vector in Equation 3, and the operating system would deny the operation.

This is further illustrated in FIG. 1. FIG. 1 illustrates an operating system environment 100 implementing a MLS access-control policy among objects. Environment 100 includes different security levels: Security Level 0 (102), Security Level 1 (104), and Security Level 2 (106). As denoted in Equation 3, for a subject object to read from or write to a target object, the target object must be less than two security levels greater than the subject object's security level.

Environment 100 further includes Object0 108 at Security Level 0 and Object2 110 at Security Level 2. Because Object2 110 is at a higher security level than Object0 108, environment 100 permits Object2 110 to read from Object0 108, as indicated by operation 112, and also permits Object2 110 to write to Object0 108, as indicated by operation 114. And because Object0 108 is two security level lower than Object2 110, environment 100 prevents Object0 108 from reading from Object2 110, as indicated by operation 116, and also prevents Object0 108 from writing to Object2 110, as indicated by operation 118. Operation 116 illustrates the access-control policy rule of Equation 3 applied to the operation vector in Equation 4.

In this way, exemplary operating system environment 100 may enforce MLS access-control rules, such as Equation 3, for operations among objects at different security levels.

While the access-control policies discussed so far in the firewall example and the operation system example in FIG. 1 are straightforward, access-control policies may be extremely complex, and may include thousands of different rules. Therefore, a single operation vector may be evaluated by thousands of different rules to determine whether or not it is permitted or denied.

Moreover, an access-control policy can be viewed or represented as a large or complex constraint on values of some operation vector. Sometimes, it may be necessary to evaluate an access-control policy against other constraints. For example, it may be necessary to compare an access-control policy with some other constraint, to see if the operations prevented/denied by the constraint are also prevented/denied by the access-control policy. As another example, it may be necessary to compare two access-control policies to determine any differences among them. These evaluations may be challenging, given the complexities and sizes of access-control policies and/or constraints.

Prior art solutions attempted to compare two sets of constraints such as access-control policies or other types of constraints. In particular, the prior art solutions identified a set of operations denied by one constraint, which are permitted by another constraint, such as an access-control policy.

FIG. 2 illustrates a Venn diagram space 200 of constraints, which may be compared by prior art solutions. Space 200 includes a set 202 representing Constraint 1, which may be an access-control policy for a firewall, operating system, or other computing platform. Constraint 1 may be represented by rules in some format or language. In this example, the area inside set 202 may represent operations prevented by Constraint 1, while the area outside set 202 may represent operations allowed by Constraint 1.

Space 200 may also include set 204 representing Constraint 2, which may be an access-control policy, or any other constraint. Constraint 2 may also be represented by rules. The area inside set 204 may represent operations prevented by Constraint 2, while the area outside set 202 may represent operations allowed by Constraint 2. Space 200 may also include set 206 representing Constraint 3, which may be an access-control policy, or any other constraint. Constraint 3 may also be represented by rules. The area inside set 206 may represent operations prevented by Constraint 3, while the area outside set 206 may represent operations allowed by Constraint 3.

Alternatively, the area inside a set may represent operations allowed by a corresponding constraint, while the area outside a set may represent operations denied by the corresponding constraint, as understood to one of ordinary skill in the art.

It may be necessary to determine the extent to which the different constraints overlap. For example, a user may need to implement a constraint, such as Constraint 2 in association with Constraint 1. The user may need to determine if the operations prevented by Constraint 2 are already prevented by Constraint 1. As shown in FIG. 2, it is clear that set 202 of Constraint 1 subsumes set 204 of Constraint 2. In this example, this means that Constraint 1 prevents all operations that are also prevented by Constraint 2.

Similarly, a user may need to determine if the operations prevented by Constraint 3 are also prevented by Constraint 1. As shown in FIG. 2, it is clear that set 202 of Constraint 1 does not completely subsume set 206 of Constraint 3. This means that Constraint 1 prevents only some operations that are prevented by Constraint 3. Accordingly, the user would not be able to rely on Constraint 1 to fully enforce Constraint 3.

While the overlap among constraints is clear from FIG. 2, these determinations may practically be difficult to make, because the constraints are represented as complex series of rules. Accordingly, the prior art uses mathematical modeling to determine the extent to which a constraint subsumes another.

One prior art solution is described in "Modeling and Verification of IPSec and VPN Security Policies," to Hamed et al. (2005). This solution is directed to verifying firewall access-control policies, specifically IPSec. The access-control policies are converted and represented as a collection of Boolean expressions. The prior art solution analyzes the access-control policies using ordered binary decision diagrams OBDD to determine the extent to which an access-control policy subsumes a constraint.

The drawback of this solution is that Boolean expressions are very low-level constructs. This may make it difficult to encode high level concepts such as constraints on processes, files, operations or packets, for example. This approach may also suffer from scalability problems. Indeed, because the Boolean expressions and OBDDs are low-level, the order of the Boolean expressions in the OBDD strongly affects the efficiency of the analysis. Therefore, when modeling complex policies or constraints, the increased size of the OBDDs may make it difficult to order the Binary expressions in the most efficient way. Moreover, this prior art solution only determines if one constraint subsumes another constraint. It does not provide multi-step verification, which allows verification of a sequence of operations.

Another prior art solution is described in "Automated Verification of Access Control Policies using a SAT Solver," to Hughes et al. (2007). In this solution, access-control policies or other constraints are converted and formalized into XACML language, and then compiled into Boolean expressions. A SAT solver is used, by processing the Boolean expressions, to compare the constraints and determine the extent to which one constraint subsumes another.

The drawback of this solution is that the XACML language is very high-level and verbose for the purposes of modeling access-control policies. It has far greater expressive power than needed for most access-control policies. Accordingly, the translation of access-control policies into XACML may be computationally intensive. This solution also does not provide multi-step verification.

Accordingly, there is a need to express an access-control policy in a language that is more expressive and scalable than a Boolean expression, and also less verbose than XACML. It may also be necessary to provide multi-step verification of access-control policies.

SUMMARY

Accordingly there is disclosed a method, performed in a computer system with at least one processor, of verifying an access-control policy against a particular constraint for a multi-step operation, comprising the steps of: expressing, by the processor, the access-control policy as a first quantifier-free form (QFF) constraint; identifying, by the processor, the particular constraint as a second QFF constraint; identifying, by the processor, an operation vector; providing, by the processor, copies of the operation vector associated with steps in the multi-step operation; determining, by the processor, a third QFF constraint using the first QFF constraint, the second QFF constraint, and the copies of the operation vector; solving, by the processor, the third QFF constraint to determine a solution; and outputting, by the processor, a result of the solving.

There is further disclosed a computer-readable medium storing program instructions, which, when executed by at least one processor, cause the at least one processor to perform a method of verifying an access-control policy against a particular constraint for a multi-step operation, the method comprising the steps of: expressing the access-control policy as a first quantifier-free form (QFF) constraint; identifying the particular constraint as a second QFF constraint; identifying an operation vector; providing copies of the operation vector associated with steps in the multi-step operation; determining a third QFF constraint using the first QFF constraint, the second QFF constraint, and the copies of the operation vector; solving the third QFF constraint to determine a solution; and outputting a result of the solving.

There is further disclosed a system for verifying an access-control policy against a particular constraint for a multi-step operation, the system comprising: at least one processor; and a memory device storing: a constraint generating unit executable on the processor and configured to express the access-control policy as a first quantifier-free form (QFF) constraint, and identify the particular constraint as a second QFF constraint; an operation vector providing unit executable on the processor and configured to identify an operation vector, and provide copies of the operation vector associated with steps in the multi-step operation; wherein the constraint generating unit is further configured to determine a third QFF constraint using the first QFF constraint, the second QFF constraint, and the copies of the operation vector; and a constraint solving unit executable on the processor and configured to solve the third QFF constraint to determine a solution, and output a result of the solving.

There is further disclosed a method, performed in a computer system with at least one processor, of verifying an access-control policy against a particular constraint, comprising the steps of: receiving, by the processor, an access-control policy in a policy language; parsing, by the processor, the access-control policy to express the access-control policy in a first quantifier-free form (QFF) constraint, wherein the first QFF form operates on fields of an operation vector; identifying, by the processor, a second QFF constraint describing the particular constraint, the second QFF constraint operating on the fields of the operation vector; solving, by the processor, the first QFF constraint with the second QFF constraint to determine the extent to which the first QFF constraint subsumes the second QFF constraint; and outputting, by the processor, a result of the solving.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other electronic devices or systems.

Reference will now be made in detail to exemplary embodiments of the present invention, examples of which are illustrated in the accompanying drawings. Whenever possible, the same reference numbers will be used throughout the drawings to refer to the same or like parts.

As discussed, the prior art solutions to access-control policy verification determine, by different methods, the extent to which one constraint (e.g., access-control policy) subsumes another constraint. But the problem of verifying an access-control policy may be more difficult when multiple steps are involved.

Figure 3:
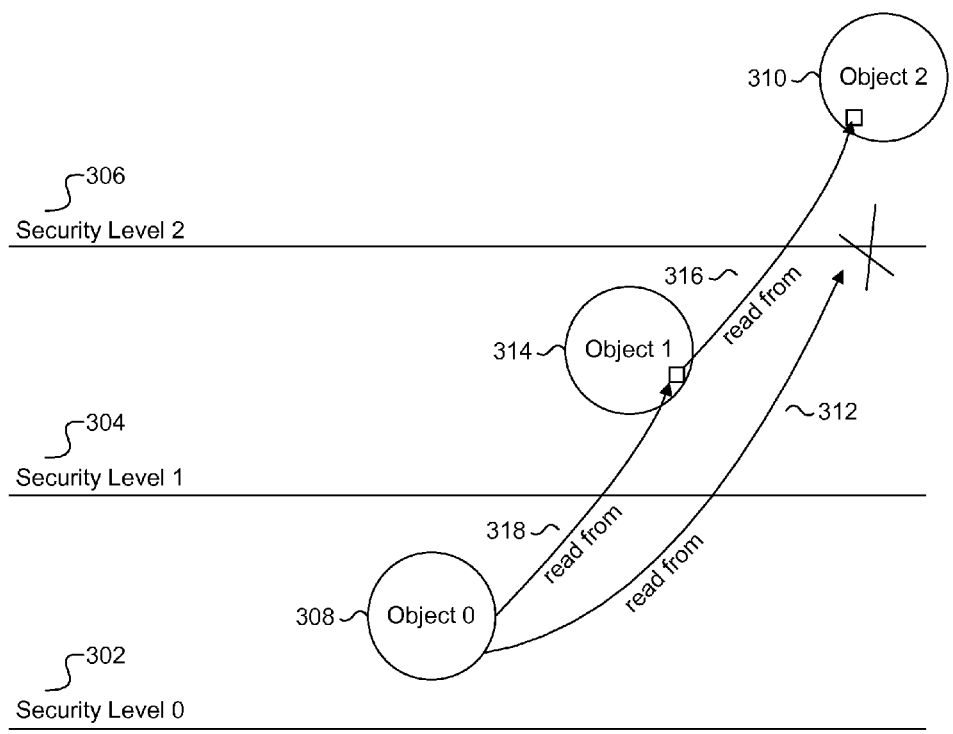
FIG. 3 illustrates an operating system environment implementing a MLS access-control policy among objects, and illustrating a multi-step operation.

FIG. 3 illustrates an operating system environment 300 implementing a MLS access-control policy among objects, and illustrating a multi-step operation. Environment 300 may enforce similar access-control policy rules as environment 100 from FIG. 1. In particular, environment 300 may implement Equation 3, which states that in order for a subject object to write to or read from a target object, the security level of the target object must be less than two levels greater than the subject object's security level.

Figure 1:
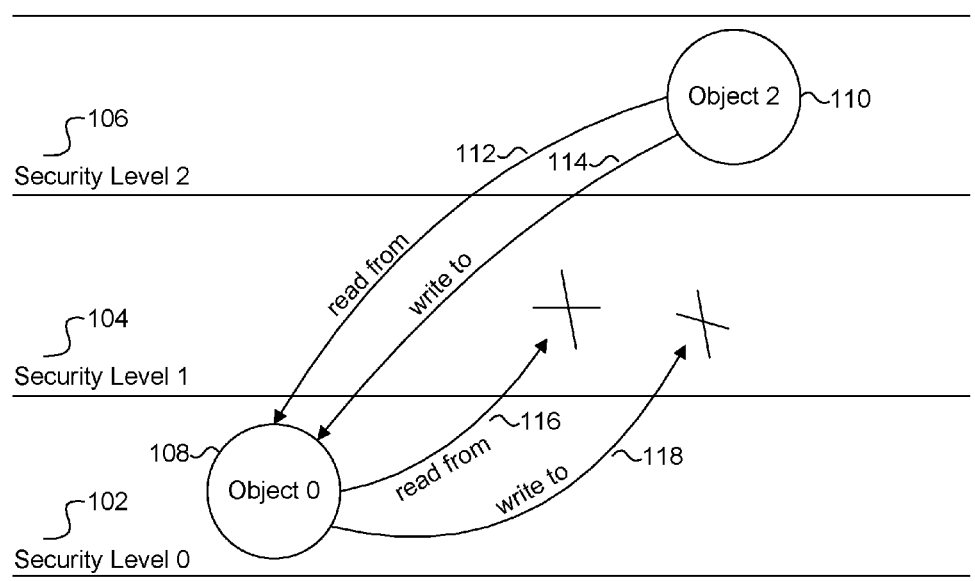
FIG. 1 illustrates an operating system environment 100 implementing a MLS access-control policy among objects.

Items 302-310 from FIG. 3 are similar to items 102-110 in FIG. 1. Environment 300 further includes operation 312, which is an attempt by Object0 308 to directly read from Object2 310. Operation 312 may be similar to operation 116 from FIG. 1. Specifically, operation 312 may be defined by the operation vector shown in Equation 4. Accordingly, operation 312 is prevented by environment 300, in accordance with the access-control policy rule in Equation 3.

Environment 300 also includes Object1 314 at Security Level 1. Object1 314 may be used to implement operation 312 as a multi-step operation. In particular, operation 312 may be divided into operation 316 and 318, both of which are allowed by the access-control policy rule represented in Equation 3.

In operation 316, Object1 314 reads from Object2 310. The operation vector for this may be:

[Object1,1,Object2,2,read]  Equation 5

The operation vector in Equation 5 describes an operation in which a subject Object1 314 with a security level 1 seeks to read from a target Object2 310 with a security level of 2. Environment 300 may apply the access-control policy rule of Equation 3 to the operation vector of Equation 5. By doing so, environment 300 may determine that operation 316 is permitted because the target object (Object2) is less than two security levels greater than the subject object (Object1). Indeed, the difference in security levels between Object1 and Object2 is only one, which is less than two. After operation 316, Object1 314 has data from Object2 310.

Next, in operation 318, Object0 308 reads from Object1 314. The operation vector for this may be:

[Object0,0,Object1,1,read]  Equation 6

The operation vector in Equation 6 describes an operation in which a subject Object0 308 with a security level 0 seeks to read from a target Object1 314 with a security level of 1. An operating system may apply the access-control policy rule of Equation 3 to the operation vector of Equation 6. By doing so, the operating system would determine that operation 318 is permitted because the target object (Object1) is less than two security levels greater than the subject object (Object0). Indeed, the difference in security levels between Object0 and Object1 is only one, which is less than two.

Accordingly, in operation 318, Object0 308 reads data from Object1 314, which previously read the same data from Object2 310. Thus, the access-control policy permits the combination of operations 316 and 318 and denies operation 312, even though they are both effectively the same operation. In this way, FIG. 3 shows an example of a multi-step operation (operations 316 and 318) permitted by an access-control policy in Equation 3, and yet violating the constraint that an subject cannot read from a target whose security level is two or more levels above the subject.

Thus, when evaluating constraints against an access-control policy, it may be necessary to determine if an access-control policy will properly deny an operation prevented by a constraint, but will improperly allow a series of operations that, while individually do not violate the constraint, do so collectively.

Figure 4:
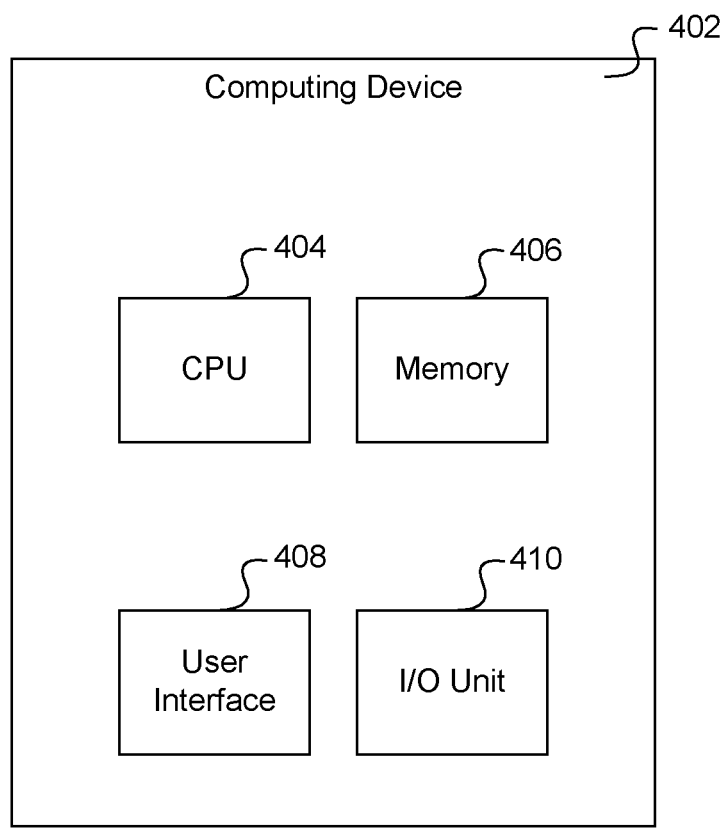
FIG. 4 illustrates a computer system for verifying access-control policies.

FIG. 4 illustrates a computer system 400 for verifying access-control policies. In some embodiments, computer system 400 may identify multi-step operations that violate a constraint, but are permitted by an access-control policy.

Although a specific number of components are depicted in FIG. 4, any number of these components may be provided. Furthermore, the functions provided by one or more components of system 400 may be combined or separated. And the functionality of any one or more components of system 400 may be implemented by any appropriate computing environment.

System 400 may include a computing device 402. Device 402 may perform computing tasks, such as verifying access-control policies or enforcing access-control policies. Device 402 may be a desktop computer, laptop computer, a firewall, client, server, handheld, or mobile device. Device 402 may include a central processing unit (CPU) 404, a memory 406, a user interface 408, and/or an I/O unit 410.

CPU 404 may execute computer program instructions to perform various processes and methods. CPU 404 may include a single processor or multiple processors. The multiple processors may execute in a single location or across multiple locations. CPU 404 may read the computer program instructions from memory 406 or from any computer-readable storage medium included in device 402, external to device 402, or accessible to device 402, for example, over a network. Memory 406 may include random access memory (RAM) and/or read only memory (ROM) configured to access and store information, such as access-control policies and other constraints, and computer program instructions. Memory 406 may also include additional memory to store data and computer program instructions, and/or one or more internal databases (not shown) to store tables, lists, or other data structures. Memory 406 may include a single memory device or multiple memory devices. The multiple memory devices may occur in a single location or may be distributed across multiple locations.

User interface 408 may access user data, such as a user input for verifying access-control policies. In some embodiments, user interface 408 may be separate from device 402. User interface 408 may also include a visual display, keyboard, mouse, or touch screen, for example. I/O unit 410 may access data over a network or local drive. In addition, device 402 may access legacy systems (not shown) via a network, or may directly access legacy systems, databases, or other network applications.

Figure 5:
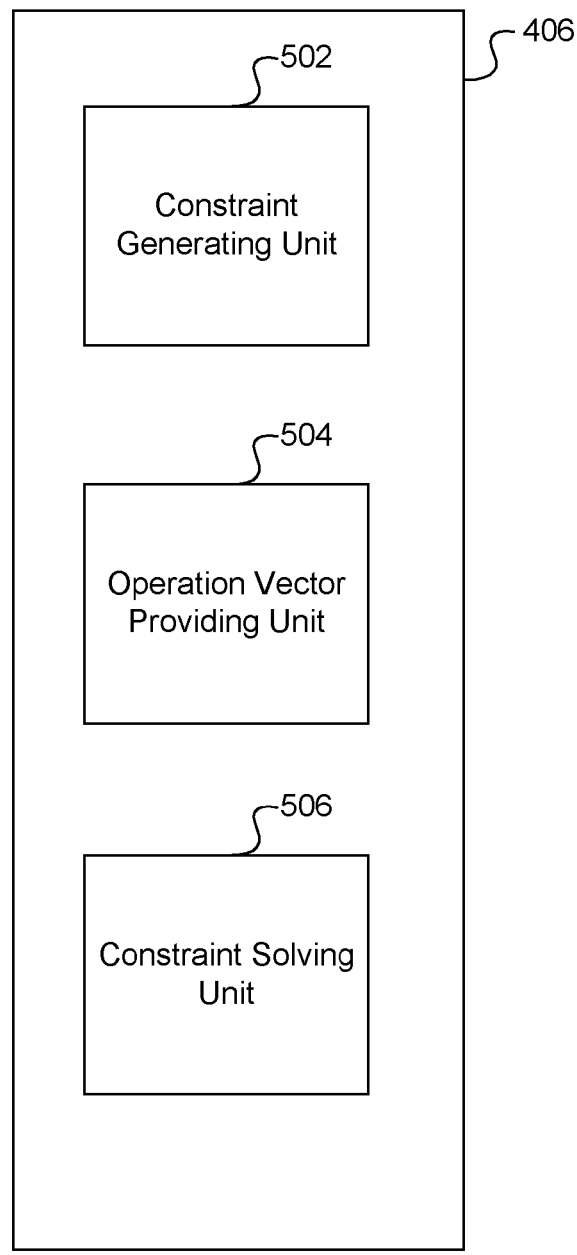
FIG. 5 illustrates a memory, which includes components that may be used for verifying access-control policies.

FIG. 5 illustrates a memory 406, which includes components that may be used for verifying access-control policies. The components in memory 406 may be logical portions or aspects of computer programs or computer program instructions stored in memory 406. These components may be implemented in hardware, software, or firmware, or a combination thereof.

Memory 406 may include Constraint Generating Unit 502, Operation Vector Providing Unit 504, and Constraint Solving Unit 506.

Constraint Generating Unit 502 may receive two or more constraints to compare with each other. For example, Constraint Generating Unit 502 may receive an access-control policy and a particular constraint. A user or process may need to determine the extent to which operations prohibited by the particular constraint are also prohibited by the access-control policy, for example. In another example, the user or process may need to determine the extent to which operations permitted by the constraint are also permitted by the access-control policy.

The access-control policy and constraint may be expressed in some language or format. For example, one or more of the access-control policy or constraint may be expressed in accordance with an IPSec policy or SELinux policy, as understood by one of ordinary skill in the art.

Constraint Generating Unit 502 may parse the access-control policy and/or the constraint to express one or more of them in an arithmetic quantifier-free form (QFF). The use of QFF in modeling access-control policies may be an advancement over the prior art. The QFF language may be a Boolean combination of simple/primitive arithmetic constraints. For example, a QFF expression may be in the form of:

$$X \, op \, Y \qquad \text{Equation 7}$$

where X and Y are integer variables or constants (not just Boolean TRUE/FALSE constructs), and "op" is one or more of the following constraints: $=, <, >, <=, >=$, etc. Expressions of the type in Equation 7 may be joined with similar expressions using logical operators, such as AND, OR, etc.

A QFF expression may also be in the form of:

$$\text{contained}(a,m,b,n) \qquad \text{Equation 8}$$

which is true when the address range represented by (a, n) contains the address range represented by (b, n), where a, m, b, and n are integer variables or constants. The expression in Equation 8 may be useful in firewalls or other network systems.

In this way, the QFF language is more expressive than simple Boolean logic, and expresses high level concepts easily. The QFF language is also more scalable than Boolean logic. The QFF language is also less verbose than XACML. As a result, QFF is easier to use than either prior art solution of using Boolean logic or XACML. Moreover, as will be described, QFF permits verification of an access-control policy to take into account multi-step operations.

The QFF expressions of the access-control policy and constraint may be applied to fields of an operation vector. Operation Vector Providing Unit 504 may provide a generic operation vector with a predefined number of fields, and variables in the fields. For example, Operation Vector Providing Unit 504 may provide the operation vector of the form:

$$[a,b,c,d,e] \qquad \text{Equation 9}$$

A set of values for the variables a-e may define a specific operation, for example, an operating system read/write, or a network packet passing through a firewall. But the generic operating vector in Equation 9 only describes a type of operation, and not a specific operation. For example, Equation 9 may express an operation vector format for describing an operating system read/write.

In some embodiments, Operation Vector Providing Unit 504 may provide multiple copies of a generic operation vector. Each of the copies may represent a step in a multi-step operation. For example, Operation Vector Providing Unit 504 may provide the following copies of a generic operation vector, with different variable identifiers:

$$[a1,b1,c1,d1,e1] \qquad \text{Equation 10}$$

$$[a2,b2,c2,d2,e2] \qquad \text{Equation 11}$$

$$[a3,b3,c3,d3,e3] \qquad \text{Equation 12}$$

Each of Equations 10-12 is a copy of the generic operation vector in Equation 9, and may represent a step in a multi-step operation.

Constraint Solving Unit 506 may solve the access-control policy expressed in QFF with the particular constraint expressed in QFF, both generated by Constraint Generating Unit 502, as applied to the operation vector (Equation 9) or copies of the operation vector (Equations 10-12) as provided by Operation Vector Providing Unit 504. Constraint Solving Unit 506 may be Kodkod, or some other constraint solver or SAT solver known in the art. In some embodiments, Constraint Solving Unit 506 may output an indication of the extent to which the access-control policy subsumes the constraint. In some embodiments, Constraint Solving Unit 506 may take into account multi-step operations by using copies of the operation vector (Equations 10-12).

Figure 6:
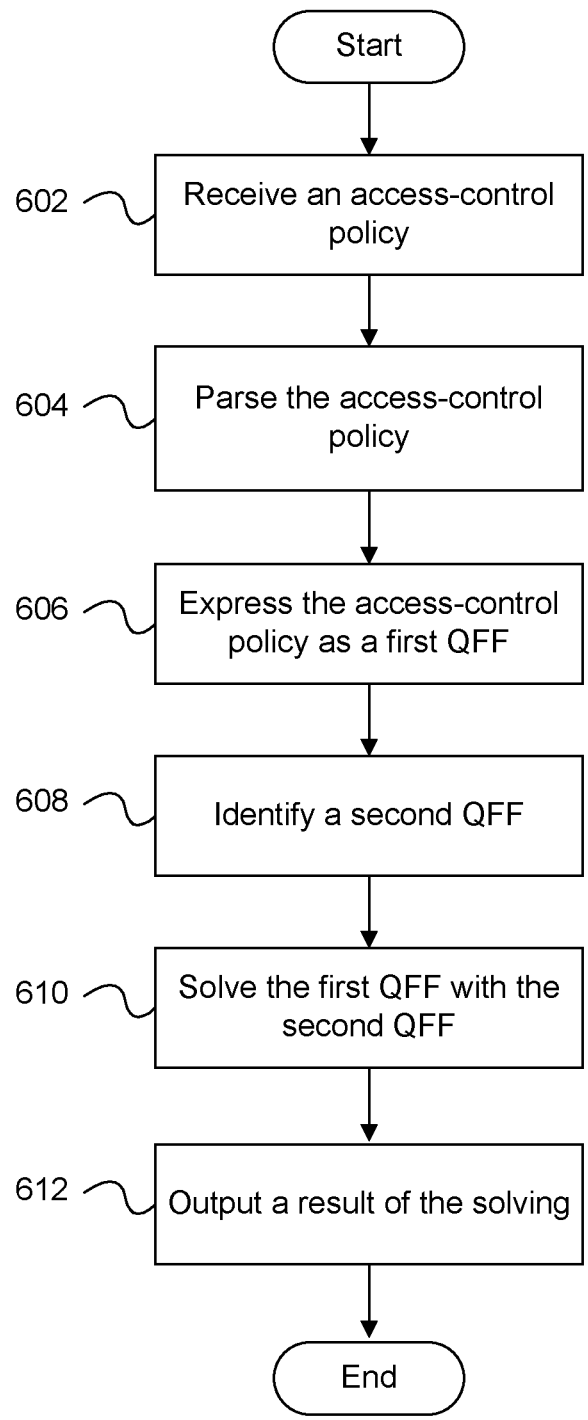
FIG. 6 illustrates a method of verifying an access-control policy against a particular constraint.

FIG. 6 illustrates a method 600 of verifying an access-control policy against a particular constraint. Method 600 may be executed by CPU 404 from FIG. 4 by program instructions or other components stored in Memory 406, such as Constraint Generating Unit 502, Operating Vector Providing Unit 504, and/or Constraint Solving Unit 506.

At block 602, Constraint Generating Unit 502 may receive an access-control policy in a policy language. The policy language may be, for example, a statement expressed in accordance with an IPSec policy or SELinux policy, as understood by one of ordinary skill in the art.

At block 604, Constraint Generating Unit 504 may parse the access-control policy and convert the access-control policy from the policy language to a first QFF constraint. Accordingly, at block 606, Constraint Generating Unit 504 may express the access-control policy as the first QFF constraint. The first QFF constraint may operate on fields of a generic operation vector. The generic operation vector may be provided by Operating Vector Providing Unit 504. The generic operation vector may be similar to Equation 9, as discussed above. But the specific format of Equation 9 is exemplary only, and any number or type of fields or variables may be used alternatively.

The generic operation vector provided by Operating Vector Providing Unit 504 may generically describe a type of operation, such as a write to an object in an operating system, a read from an object in an operating system, and a network data packet. The operation vector may describe other types of operations as well, and these operation types are exemplary only.

At block 608, Constraint Generating Unit 504 may identify a second QFF constraint. The second QFF constraint may be a particular constraint compared with the first QFF constraint of the access-control policy, to determine the extent to which the first QFF constraint subsumes the second QFF constraint. The second QFF constraint may also operate on the fields of the same operation vector provided by Operating Vector Providing Unit 504.

At block 610, Constraint Solving Unit 506 may solve the first QFF constraint with the second QFF constraint to determine the extent to which the first QFF constraint subsumes the second QFF constraint. At block 612 Constraint Solving Unit 506 may output a result of the solving. For example, Constraint Solving Unit 506 may store the result in memory, such Memory 406 or output the result to a user via User Interface 408.

For example, should the first QFF constraint of the access-control policy completely subsume the second QFF constraint (such as set 202 subsuming set 204 in FIG. 2), then Constraint Solving Unit 506 may output the empty set at block 612 as the result of the solving. This may be because there are no operations prevented by the second QFF constraint that are not also prevented by the first QFF constraint, in this example. Alternatively, should the first QFF constraint of the access-control policy not subsume the second QFF constraint (such as set 202 not completely subsuming set 206 in FIG. 2), then Constraint Solving Unit 506 may output a set of values for the generic operation vector at block 612 as the result of the solving. The set of values for the generic operation vector may define a specific operation prevented by the second QFF constraint but permitted by the first QFF constraint.

Figure 7:
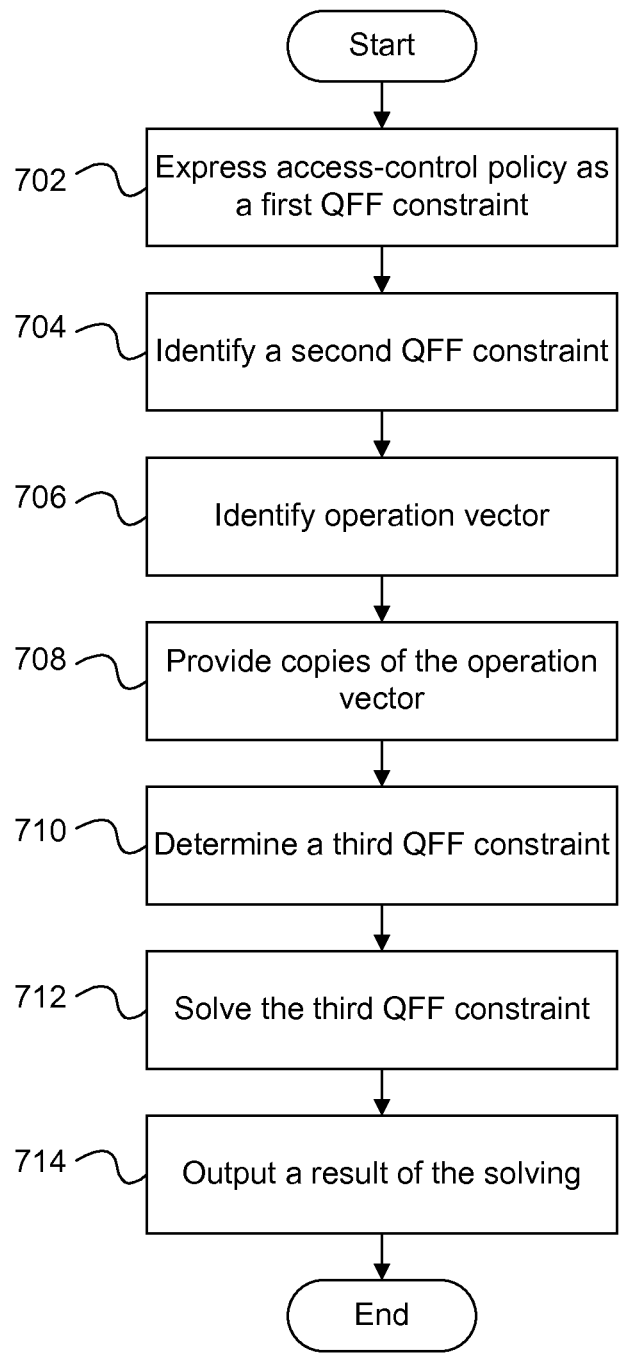
FIG. 7 illustrates a method of verifying an access-control policy against a particular constraint for a multi-step operation.

FIG. 7 illustrates a method 700 of verifying an access-control policy against a particular constraint for a multi-step operation. Method 700 may be executed by CPU 404 from FIG. 4 by program instructions or other components stored in Memory 406, such as Constraint Generating Unit 502, Operating Vector Providing Unit 504, and/or Constraint Solving Unit 506.

At block 702 Constraint Generating Unit 502 may express the access-control policy as a first quantifier-free form (QFF) constraint. In some embodiments, Constraint Generating Unit 502 may receive the access-control policy in a policy language and parse the policy language to express the access-control policy as the first QFF constraint.

The first QFF constraint may be represented by the following function:

$$\text{Legal}(\text{OpVec}) \qquad \text{Equation 13}$$

Thus, Legal is a QFF constraint on fields of an operation vector OpVec, which may be a generic operation vector similar to Equation 9. Accordingly, when Legal is true for any combination of values in OpVec, the access-control policy may permit the associated operation. Concrete examples of Equation 13 in QFF may be found in the Appendix. Other examples of QFF may be found in the indices accompanying Applicant's provisional application 61/287,307, the contents of which are fully incorporated by reference.

At block 704, Constraint Generating Unit 502 may identify the particular constraint as a second QFF constraint. In this example, the second QFF constraint may be represented by the following function:

$$\text{Bad}(\text{OpVec}\_1, \ldots, \text{OpVec}\_k) \qquad \text{Equation 14}$$

Thus, Bad is a QFF constraint on fields of a number of copies of an operation vector OpVec, such as OpVec_1 ..., OpVec_k, for a total of k operation vector copies. These operation vectors may be copies of a generic operation vector, and may be similar to those described in Equations 10-12. Moreover, each of these operation vectors may represent an operation step in a multi-step operation. The Bad QFF constraint may operate on all variables in the copies of the operation vectors. For example, if Equations 10-12 represent the operation vector copies, then Bad may operate on variables a1, b1, c1, d1, e1, a2, b2, c2, d2, e2, a3, b3, c3, d3, and e3 of these operation vectors. When the QFF constraint of Bad is true, then some operation is allowed by Bad to occur. In this example, the operation allowed by Bad may be undesirable. Accordingly, method 700 may compare Bad with Legal to determine if "Bad" operations (permitted by Equation 14) are "Legal" (permitted by Equation 13).

In block 706, Operating Vector Providing Unit 504 may identifying an operation vector. For example Operating Vector Providing Unit 504 may identify OpVec from Equation 13, which may be similar to the exemplary generic operation vector in Equation 9. As illustrated in Equation 9, the operation vector may include a plurality of fields (e.g., a-e).

At block 708, Operating Vector Providing Unit 504 may provide copies of the operation vector associated with steps in the multi-step operation. For example Operating Vector Providing Unit 504 may provide OpVec_1, ..., OpVec_k from Equation 14, which may be similar to the operation vector copies in Equations 10-12. Accordingly, each of the copies of the operation vector may represent an operation step in the multi-step operation. As also illustrated in Equations 10-12, each of the copies of the operation vector may include a different set of variables for the fields (e.g., a1-e1, a2-e2, and a3-e3)

At block 710, Constraint Generating Unit 502 may determine a third QFF constraint using the first QFF constraint, the second QFF constraint, and the copies of the operation vector. In particular, Constraint Generating Unit 502 may instantiate multiple copies of the first QFF constraint, such as Equation 13. Constraint Generating Unit 502 may then apply each of the instantiated first QFF constraints (e.g., multiple copies of Legal) to one of the operational vector copies provided by Operating Vector Providing Unit 504, such as OpVec_1, OpVec_k or Equations 10-12. In this way, the third QFF may include multiple instances of the first QFF constraint each separately applied to different copies of the operation vector. This may be represented as:

$$\text{Legal}(\text{OpVec}\_1) \& \ldots \& \text{Legal}(\text{OpVec}\_k) \qquad \text{Equation 15}$$

In Equation 15 each instantiated copy of Legal is applied to a different copy of OpVec. These expressions are then logically ANDed together (represented by the "&"). The call to Legal at step i between 1 and k, checks if the i'th operation is permitted.

Constraint Generating Unit 502 may also apply the second QFF constraint to the copies of the operation vector. For example, Constraint Generating Unit 502 may apply Bad from Equation 14 to the copies of OpVec_1, ... OpVec_k or Equations 10-12. This may be represented as:

$$\text{Bad}(\text{OpVec}\_1, \ldots \text{OpVec}\_k) \qquad \text{Equation 16}$$

In Equation 16, a single instance of Bad is applied to all copies of OpVec. This is possible because Bad is defined to apply to variables in OpVec_1, ... OpVec_k, in Equation 14. Legal, by contrast is defined to apply to only a single generic operation vector OpVec, as in Equation 13. Therefore, when evaluating multiple copies of the operation vector OpVec, Legal may instantiate a new copy of itself for each of the operation vector copies (as in Equation 15), while Bad may only be a single instance applied to all the operation vector copies (as in Equation 16). The call to Bad checks that these steps jointly satisfy a bad condition.

As discussed, the third QFF constraint may be determined using the first QFF constraint, the second QFF constraint, and the copies of the operation vector. In some embodiments, the third QFF constraint may be determined by combining Equations 15 and 16. For example, the third QFF constraint may be represented by:

$$\text{Legal}(\text{OpVec}\_1) \& \ldots \& \text{Legal}(\text{OpVec}\_k) \& \text{Bad}(\text{OpVec}\_1, \ldots \text{OpVec}\_k) \qquad \text{Equation 17}$$

Equation 17 is a logical AND operation between Equation 15 and Equation 16, represented by the "&" operator. In this way, the third QFF evaluates the first QFF constraint (relating to the access-control policy) and the second QFF constraint (relating to the particular constraint) for k steps in a multistep operation. Indeed, because each copy of OpVec refers to an operational step in the multi-step operation, Equation 17 evaluates Legal and Bad over multiple, k, steps.

In block 712, Constraint Solving Unit 506 may solve the third QFF constraint to determine a solution. For example, a program like Kodkod, as is known in the art, may solve the expression of Equation 17. In block 714, Constraint Solving Unit 506 may output a result of the solving. For example, Constraint Solving Unit 506 may store the result in memory, such Memory 406 or output the result to a user via User Interface 408. The output may be either the empty set or one or more sets of values for the operation vector, such as OpVec.

Figure 8:
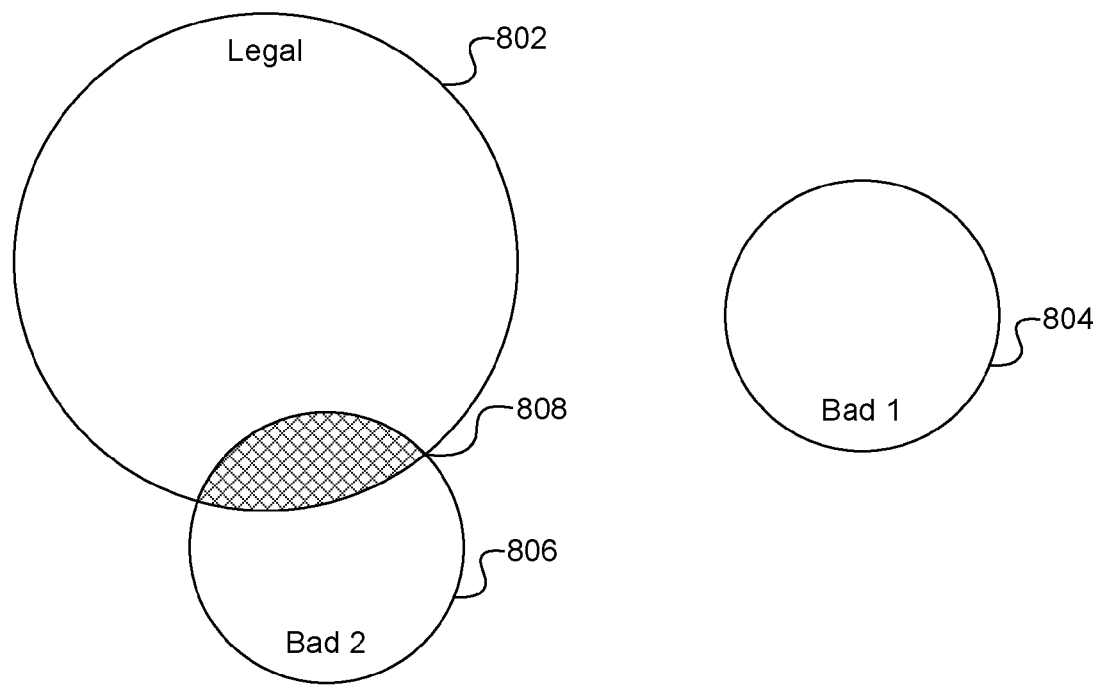
FIG. 8 illustrates a Venn diagram space illustrating the solving of the third QFF constraints and outputted results.

FIG. 8 illustrates a Venn diagram space 800 illustrating the solving of the third QFF constraints and outputted results. Space 800 includes set 802 associated with Legal and set 804 associated with Bad 1. The area inside set 802 may represent operations that are permitted by Legal. Accordingly, if Legal is separately true for all operation steps in a multi-step operation, then those steps fall within set 802.

By contrast, the area inside set 804 may represent operations that are permitted by Bad 1. These may be operations that a user or process tries to prevent. Accordingly, if Bad 1 is true for a combination of steps in the multi-step operation, then those combined steps fall within set 804. If set 802 of Legal and set 804 of Bad 1 do not intersect, then there are no Bad 1 operations permitted by Legal. Accordingly, in this scenario, Constraint Solving Unit 506 may output the empty set, an error message, or any other appropriate indication. As shown in FIG. 8, there is no area of Venn diagram space 800 in which set 802 and set 804 intersect.

Venn diagram space 800 also includes set 806, associated with Bad 2. The area inside set 806 may represent operations that are permitted by Bad 2. Accordingly, if Bad 2 is true for a combination of steps in the multi-step operation, then those combined steps fall within set 806. If set 802 of Legal and set 806 of Bad 2 do intersect, then there are some Bad 2 operations permitted by Legal. Accordingly, in this scenario, Constraint Solving. Unit 506 may output one or more sets of values for the operation vector (e.g., OpVec). These sets of values each define "Bad" operations identified by Bad 2 and permitted by Legal. As shown in Venn diagram space 800, set 802 of Legal and set 806 of Bad 2 intersect at hatched area 808. Accordingly, Constraint Solving Unit 506 may output one or more sets of operation vector values that define operations in hatched area 808.

Figure 2:
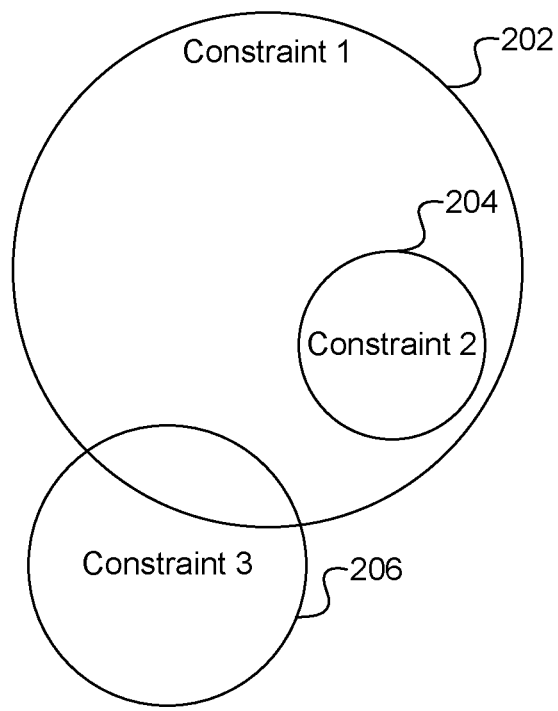
FIG. 2 illustrates a Venn diagram space of constraints, which may be compared by prior art solutions.

Venn diagram space 800 from FIG. 8 may be defined in an opposite manner as Venn diagram space 200 from FIG. 2. In particular, the area inside sets in Venn diagram space 200 represent operations prevented by a constraint. By contrast, the area inside sets in Venn diagram space 800 represent operations permitted by a constraint. One of ordinary skill will recognize that either type of Venn diagram may be used in describing disclosed embodiments.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the claims.

APPENDIX

We now show how to use our invention to reason about access control across multiple steps. For example, one may want to check whether it is possible for information to flow from one entity to another via a sequence of intermediate agents. Access control policies only govern a single step so it is not obvious that multi-step flows satisfy intended security goals.

As before, we transform an access control policy into a QFF constraint Legal on a generic operation vector of variables called OpVec. These variables are the fields of an operation that needs to be performed, whether it be a packet's attempt at passing through a firewall, or a process' attempt at writing to a file. When Legal is true for any values of these variables, the associated operation is permitted by the access control policy.

For multi-step reasoning, we instantiate OpVec as many times as there are steps. To verify that it is not possible for there to be k operations that permit a Bad condition to hold, we check that the following constraint is unsolvable:

Legal(OpVec_1)& ... & Legal(OpVec_k)& Bad (OpVec_1, ... , OpVec_k)

The call to Legal at step i checks that the i'th operation is permitted. Bad checks that the k steps do result in an undesirable condition. If they do, then Constraint Solver will find values of fields in these operations, demonstrating how to cause the bad behavior. If they do not, the Constraint Solver will halt with failure, indicating that no legal sequence of k operations results in bad behavior.

We now illustrate this idea for another class of SELinux policy rules, namely, Conditional Rules. The fact that we can handle this class indicates the broad applicability of our invention. Each SELinux conditional rule is of the form:

Condition, allow, Subject, Target, Class, ListOps

This means Subject is allowed to perform any operation in the set ListOps on Target of type Class, provided Condition holds. Condition is a constraint on a special class of variables called SELinux Booleans. Their values do not change across operations. The operation vector for such rules is, as before, [subject, target, class, operation]. A rule of the above form is transformed into the constraint:

```
Condition &
subject=Subject &
target=Target &
class=Class &
(operation=c1 or operation=c2 or ... or operation=ck), each ci a
member of ListOps
```

The definition of Legal is then a disjunction of constraints derived for all the rules.

An example of such a rule is:

```
b_vm0_cddvd_mapped & b_vm0_highest_is_topsecret
allow,
vm0_t,
device_t,
dir,
[ioctl, write]
```

The translation of the above rule into a QFF constraint:

```
and[
  b_vm0_cddvd_mapped
    b_vm0_highest_is_topsecret
    subject=vm0_t
    target=device_t
    class=dir
    or[ operation=ioctl, operation=write]
```

Suppose policy P consists of the above rule along with the following:

```
b_vm1_cddvd_mapped & b_vm1_highest_is_secret
allow,
vm1_t,
device_t,
dir,
[ioctl, read]
```

Then, the definition of Legal([subject, target, class, operation]) is the QFF:

```
      or[
   and[
   b__vm0__cddvd__mapped
          b__vm0__highest__is__topsecret
          subject=vm0__t
          target=device__t
          class=dir
          or[ operation=ioctl, operation=write]]
   and[
          b__vm2__cddvd__mapped
          b__vm2__highest__is__topsecret
          subject=vm2__t
          target=device__t
          class=dir
             or[operation=ioctl, operation=read]]]
```

Suppose, we now want to check if a subject can write to a target in the first step and another subject can read from the same target in the next step. This would imply a two step information flow from the first subject to the next. We would define this condition Bad([subject__1, target__1, class__1, operation__1, subject__2, target__2, class__2, operation__2]) to be the constraint:

```
              and[
              not [subject__1=subject__2],
                  operation__1=write
                  operation__2=read
                  class__1=class__2
                  target__1=target__2]
```

We would then check whether the constraint

```
Legal([subject__1, target__1, class__1, operation__1]) &
Legal([subject__2, target__2, class__2, operation__2]) &
Bad([subject__1, target__1, class__1, operation__1, subject__2,
target__2, class__2, operation__2])
``` has a solution. The solution turns out to be:

```
                        subject__2=vm1__t
                        target__2=device__t
                        class__2=dir
                        operation__2=read
                        subject__1=vm0__t
                        target__1=device__t
                        class__1=dir
                        operation__1=write
```

What is claimed is:

1. A method comprising:
verifying, by a processor, the processor comprising hardware, an access-control policy for operating system objects against a particular constraint for a multi-step operation between operating system objects to determine an extent to which handling of the multi-step operation by the access-control policy is consistent with handling of the multi-step operation by the particular constraint, the verifying comprising:
   expressing the access-control policy as a first quantifier-free form (QFF) constraint;
   identifying the particular constraint as a second QFF constraint, the second QFF constraint for comparison to the first QFF constraint to determine the extent to which handling of the multi-step operation by the access-control policy is consistent with handling of the multi-step operation by the particular constraint, wherein the multi-step operation may be broken-down into a sequence of multiple operation steps;
   identifying an operation vector generically defining the multi-step operation between operating system objects;
   providing for each operation step of the sequence of multiple operation steps of the multi-step operation, a respective copy of the operation vector, the respective copy representing the operation step of the multi-step operation;
   determining a third QFF constraint based on the first QFF constraint, the second QFF constraint, and the provided copies of the operation vector;
   solving the third QFF constraint to determine a solution, the solution indicative of a level of consistency between the access-control policy and the particular constraint in handling the multi-step operation; and
   outputting the solution.

2. The method of claim 1, wherein the solution comprises at least one of:
   an empty set, indicating that the access-control policy does not permit the multi-step operation; or
   operation vector values enumerating particular multi-step operations described by the second QFF constraint and permitted by the access-control policy.

3. The method of claim 1, wherein the third QFF constraint comprises a combination of:
   multiple instances of the first QFF constraint each separately applied to different operation vectors of the provided copies of the operation vector, wherein solving the third QFF constraint comprises an evaluation of the multiple instances of the first QFF constraint for at least one set of variables to identify how the access-control policy handles the multi-step operation when applied to the at least one set of variables; and
   the second QFF constraint applied to the provided copies of the operation vector, wherein solving the third QFF comprises an evaluation of the second QFF constraint for the at least one set of variables to identify how the particular constraint handles the multi-step operation when applied to the at least one set of variables.

4. The method of claim 1, wherein expressing the access-control policy further comprises parsing the access-control policy to express the access-control policy as the first QFF constraint.

5. The method of claim 1, wherein:
   the operation vector generically defining the multi-step operation comprises a plurality of fields; and
   each of the provided copies of the operation vector include a different set of variables for the fields, wherein a set of variables of a provided copy of the operation vector represents variables for the operation step represented by that provided copy of the operation vector.

6. A non-transitory computer-readable medium storing program instructions, which, when executed by a processor, cause the processor to execute operations comprising:
verifying an access-control policy for operating system objects against a particular constraint for a multi-step operation between operating system objects to determine an extent to which handling of the multi-step operation by the access-control policy is consistent with handling of the multi-step operation by the particular constraint, the verifying comprising:
   expressing the access-control policy as a first quantifier-free form (QFF) constraint;
   identifying the particular constraint as a second QFF constraint, the second QFF constraint for comparison to the first QFF constraint to determine the extent to which handling of the multi-step operation by the access-control policy is consistent with handling of the multi-step operation by the particular constraint, wherein the multi-step operation may be broken-down into a sequence of multiple operation steps;

identifying an operation vector generically defining the multi-step operation between operating system objects;

providing for each operation step of the sequence of multiple operation steps of the multi-step operation, a respective copy of the operation vector, the respective copy of the operation vector representing the oration step of the multi-step operation;

determining a third QFF constraint based on the first QFF constraint, the second QFF constraint, and the provided copies of the operation vector;

solving the third QFF constraint to determine a solution, the solution indicative of a level of consistency between the access-control policy and the particular constraint in handling the multi-step operation; and outputting the solution.

7. The non-transitory computer-readable medium of claim 6, wherein the solution comprises at least one of:

an empty set, indicating that the access-control policy does not permit the multi-step operation; or operation vector values enumerating particular multi-step operations described by the second QFF constraint and permitted by the access-control policy.

8. The non-transitory computer-readable medium of claim 6, wherein the third QFF constraint comprises a combination of:

multiple instances of the first QFF constraint each separately applied to different operation vectors of the provided copies of the operation vector, wherein solving the third QFF constraint comprises an evaluation of the multiple instances of the first QFF constraint for at least one set of variables to identify how the access-control policy handles the multi-step operation when applied to the at least one set of variables; and the second QFF constraint applied to the provided copies of the operation vector, wherein solving the third QFF comprises an evaluation of the second QFF constraint for the at least one set of variables to identify how the particular constraint handles the multi-step operation when applied to the at least one set of variables.

9. The non-transitory computer-readable medium of claim 6, wherein expressing the access-control policy further comprises parsing the access-control policy to express the access-control policy as the first QFF constraint.

10. The non-transitory computer-readable medium of claim 6, wherein:

the operation vector generically defining the multi-step operation comprises a plurality of fields; and each of the provided copies of the operation vector include a different set of variable for the fields wherein a set of variables of a provided copy of the operation vector represents variables for the operation step represented by that provided copy of the operation vector.

11. A system comprising:

a processor; and a memory device communicably coupled to the processor, the memory storing components for verifying an access-control policy for operating system objects against a particular constraint for a multi-step operation between operating system objects to determine an extent to which handling of the multi-step operation by the access-control policy is consistent with handling of the multi-step oration by the particular constraint, wherein the stored components for verifying comprise:

a constraint generating unit executable on the processor and configured to express the access-control policy as a first quantifier-free form (QFF) constraint, and identify the particular constraint as a second QFF constraint, the second QFF constraint for comparison to the first QFF constraint to determine the extent to which handling of the multi-step operation by the access-control policy is consistent with handling of the multi-step operation by the particular constraint, wherein the multi-step operation may be broken-down into a sequence of multiple operation steps;

an operation vector providing unit executable on the processor and configured to identify an operation vector generically defining the multi-step operation between operating system objects, and provide, for each operation step of the sequence of multiple operation steps of the multi-step operation, a respective copy of the operation vector, the respective copy representing the operation step of the multi-step operation;

wherein the constraint generating unit is further configured to determine a third QFF constraint based on the first QFF constraint, the second QFF constraint, and the provided copies of the operation vector; and a constraint solving unit executable on the processor and configured to solve the third QFF constraint to determine a solution indicative of a level of consistency between access-control policy and the particular constraint in handling the multi-step operation, and to output the solution.

12. The system of claim 11, wherein the solution comprises at least one of:

an empty set, indicating that the access-control policy does not permit the multi-step operation; or operation vector values enumerating particular multi-step operations described by the QFF constraint and permitted by the access-control policy.

13. The system of claim 11, wherein the third QFF constraint comprises a combination of:

multiple instances of the first QFF constraint each separately applied to different operation vectors of the provided copies of the operation vector, wherein solving the third QFF constraint comprises an evaluation of the multiple instances of the first QFF constraint for at least one set of variables to identify how the access-control policy handles the multi-step operation when applied to the at least one set of variables; and the second QFF constraint applied to the provided copies of the operation vector, wherein solving the third QFF comprises an evaluation of the second QFF constraint for the at least one set of variables to identify how the particular constraint handles the multi-step operation when applied to the at least one set of variables.

14. The system of claim 11, wherein the constraint generating unit is further configured to parse the access-control policy to express the access-control policy as the first QFF constraint.

15. The system of claim 11, wherein:

the operation vector generically defining the multi-step operation comprises a plurality of fields; and each of the provided copies of the operation vector include a different set of variables for the fields, wherein a set of variables of a provided copy of the operation vector represents variables for the operation step represented by that provided copy of the operation vector.

16. A method comprising:
verifying, by a processor, the processor comprising hardware, an access-control policy for operating system objects against a particular constraint for a multi-step operation between operating system objects to determine an extent to which handling of the multi-step operation by the access-control policy is consistent with handling of the multi-step operation by the particular constraint, the verifying comprising;
receiving the access-control policy in a policy language;
parsing the access-control policy to express the access-control policy in a first quantifier-free form (QFF) constraint, wherein the first QFF form operates on fields of a generic operation vector defining the multi-step operation between operating system objects;
identifying a second QFF constraint describing the particular constraint for the multi-step operation, the second QFF constraint for comparison to the first QFF constraint to determine the extent to which handling of the multi-step operation by the access-control policy is consistent with handling of the multi-step operation by the particular constraint, wherein the multi-step operation may be broken-down into a sequence of multiple operation steps, and wherein the second QFF constraint operates on fields of copies of the operation vector, each copy provided for, and representing, a respective operation step of the sequence of multiple operation steps of the multi-step operation;
solving the first QFF constraint with the second QFF constraint to determine a solution indicating an extent to which the first QFF constraint subsumes the second QFF constraint, the extent to which the first QFF constraint subsumes the second QFF constraint being indicative of the extent to which handling of the multi-step operation by the access-control policy is consistent with handling of the multi-step operation by the particular constraint; and
outputting the solution.

17. The method of claim 16, wherein the multi-step operation comprises at least one of: a write to an object in the operating system, or a read from an object in the operating system.

* * * * *

UNITED STATES PATENT AND TRADEMARK OFFICE
CERTIFICATE OF CORRECTION

| | |
|---|---|
| PATENT NO. | : 8,826,366 B2 |
| APPLICATION NO. | : 12/837068 |
| DATED | : September 2, 2014 |
| INVENTOR(S) | : Narain et al. |

It is certified that error appears in the above-identified patent and that said Letters Patent is hereby corrected as shown below:

In the Claims

Column 17, Line 12: Claim 6, Delete "oration" and insert --operation--

Column 18, Line 1: Claim 11, Delete "oration" and insert --operation--

Signed and Sealed this
Second Day of December, 2014

Michelle K. Lee
*Deputy Director of the United States Patent and Trademark Office*